United States Patent [19]
Huber

[11] 3,863,626
[45] Feb. 4, 1975

[54] APPARATUS FOR SURVEYING AND INDICATING THE PHYSICAL EFFORT OF AN INDIVIDUAL

[76] Inventor: Anton Huber, Waldhofstr. 40, Langenthal, Switzerland

[22] Filed: Dec. 13, 1972

[21] Appl. No.: 314,884

[30] Foreign Application Priority Data
Sept. 7, 1972 Switzerland.................... 13134/72

[52] U.S. Cl.................... 128/2.06 F, 128/2.05 T
[51] Int. Cl............................................. A61b 5/04
[58] Field of Search...... 128/2.05 P, 2.05 R, 2.05 T, 128/2.06 A, 2.06 F, 2.06 R

[56] References Cited
UNITED STATES PATENTS

| | | | |
|---|---|---|---|
| 3,352,300 | 11/1967 | Rose | 128/2.06 A |
| 3,442,263 | 5/1969 | Paseaud | 128/2.05 P |
| 3,473,526 | 10/1969 | Herman et al. | 128/2.05 P |
| 3,595,219 | 7/1971 | Friedlander et al. | 128/2.06 F |
| 3,613,670 | 10/1971 | Eidenhofer | 128/2.06 F |
| 3,675,643 | 7/1972 | Funfstock et al. | 128/2.06 F |
| 3,742,937 | 7/1973 | Manuel et al. | 128/2.06 A |

FOREIGN PATENTS OR APPLICATIONS

| | | | |
|---|---|---|---|
| 1,958,523 | 7/1971 | Germany | 128/2.06 A |

Primary Examiner—William E. Kamm
Attorney, Agent, or Firm—Fitzpatrick, Cella, Harper & Scinto

[57] ABSTRACT

Apparatus for surveying physical effort of a person includes means for sensing pulse rate and means for evaluating the measured pulse rate including regulatable threshold value measuring means adapted to produce a signal when the pulse rate reaches a limit value and indicating means responsive to such signal.

14 Claims, 6 Drawing Figures

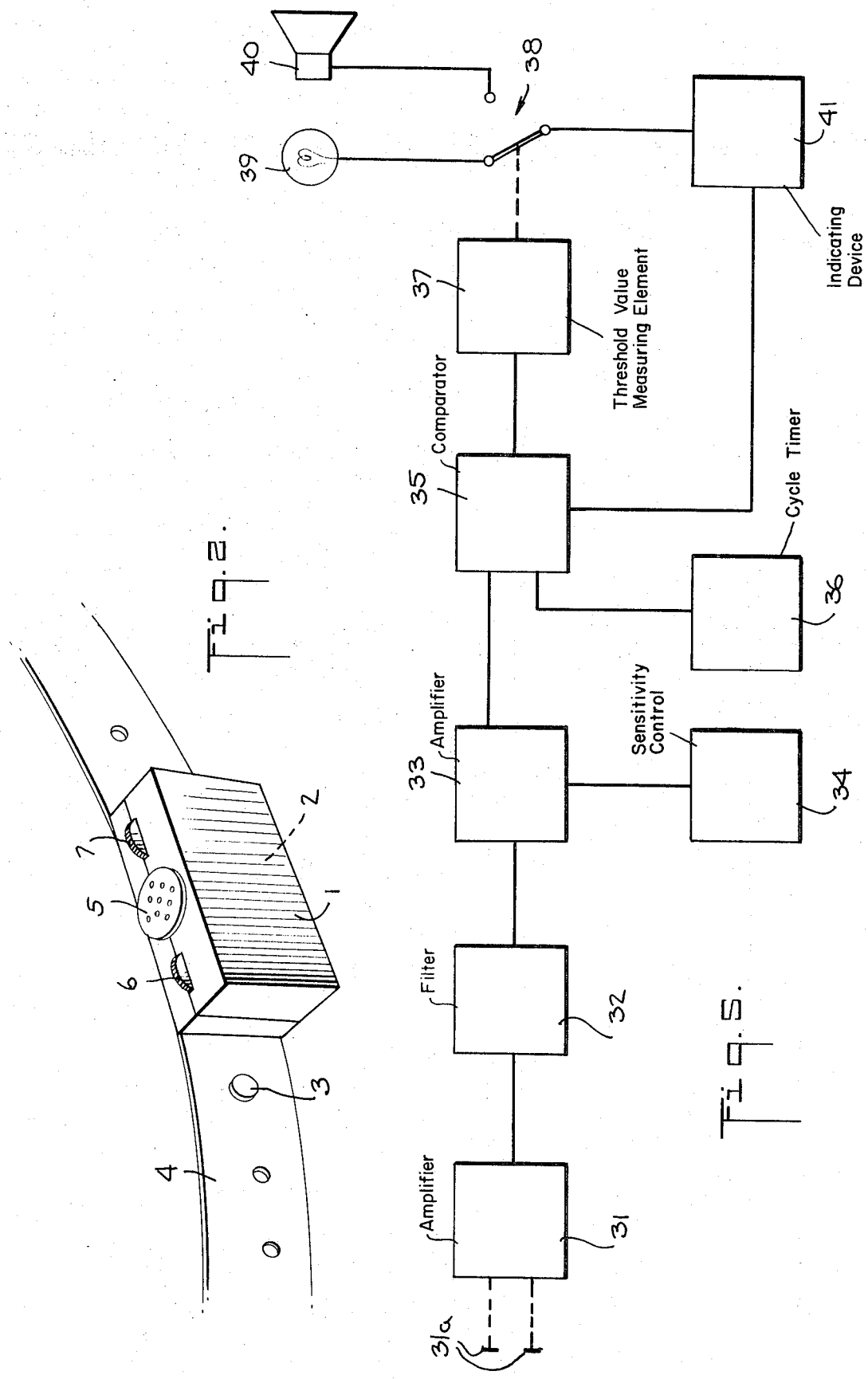

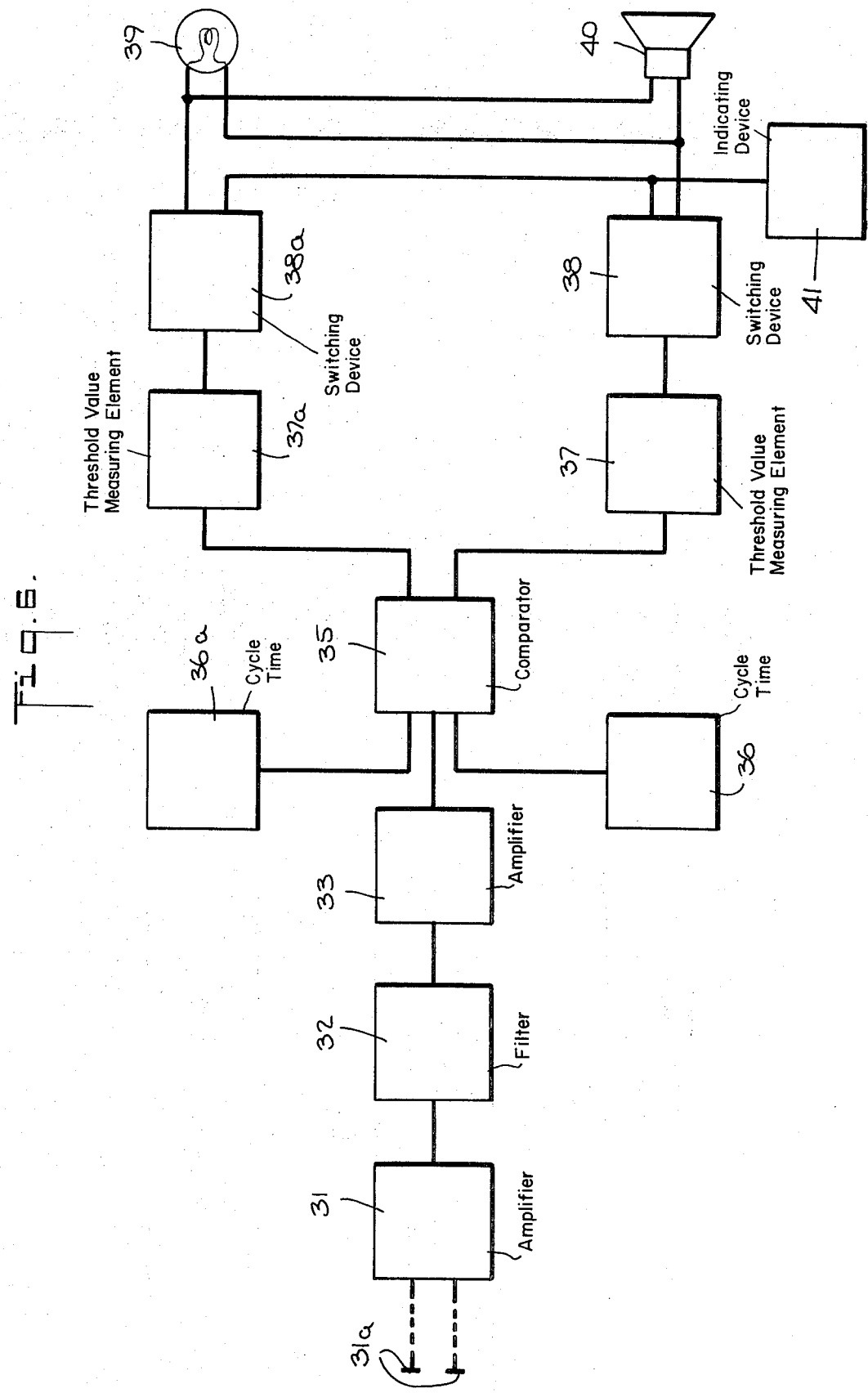

APPARATUS FOR SURVEYING AND INDICATING THE PHYSICAL EFFORT OF AN INDIVIDUAL

The present invention relates to a control apparatus for sensing or surveying the pulse frequency of an individual, particularly of active individuals such as those who engage in sports, or heart and blood circulation patients. More specifically, the present invention comprises several electrodes for sensing action signals, an amplifier and an apparatus for evaluating the measured pulse frequency.

An apparatus for surveying the pulse of an active person such as an athlete which comprises a portable apparatus for converting the pulses of the person into electrical signals, is already known. In this apparatus, furthermore, a transmitter is provided by which a carrier wave modulated with these signals is emitted. A receiver tuned with this modulated carrier wave has been placed at another location and records and eventually evaluates the pulse rate. Such apparatuses are expensive and it is not possible for an active person simultaneously to engage in the activity and to operate the apparatus.

It is the purpose of the present invention to avoid these disadvantages and to provide apparatus which enables the person to survey the pulse which depends on the physical effort and announces the transgression or undergoing of certain limits. Furthermore, the apparatus is simple to operate and relatively inexpensive to produce.

According to the present invention, I achieve the desired objectives by placing the control apparatus in a flat enclosure, by providing an elastic strip for fixing the control apparatus on the body and for carrying the electrodes, and by constructing the apparatus to comprise a first regulatable threshold value measuring element for producing a signal if the pulse frequency reaches an upper limit value, and a second regulatable threshold value measuring element for producing another signal if the pulse frequency reaches a lower limit value, and an acoustic and/or optical indicating apparatus. I have found operation of the apparatus and surveying according to various criterions can advantageously be achieved in a simple way if two adjustable threshold measuring elements are provided for emitting signals at an upper and a lower limit value.

It is possible to realize the present invention in a particularly simple manner if each threshold value measuring element comprises a monostable multivibrator, the resetting time of which is adjustable and if the outputs of these multivibrators are connected with a coincidence circuit for activating an AF Generator if the upper threshold value is exceeded or the lower threshold value undergone.

According to the present invention, the disturbance free sensing of heart action potentials and improvement of the general operating characteristics of this apparatus can be improved in a simple manner by choosing the input sensitivity of the amplifier to be between 0.20 and 1 mV, preferably 0.5 mV.

Thereby the sensing of muscle potentials at the circuit input is avoided in a most simple manner. Notwithstanding that, in known apparatuses such as electrocardiographs, considerable efforts have been made to increase input sensitivity, and in spite of the generally existing opinion that control apparatuses should have at least an input sensitivity of 0.1 mV, it has become apparent that according to the present invention, and by the described reduction of input sensitivity, an improvement of the control apparatus can be obtained.

In combination with reduction of input sensitivity, it is particularly advantageous to provide in series with the amplifier, and after the same, a frequency filter which suppresses signals of a frequency lower than 0.66 Hz and higher than 3.3 Hz and allows passage of signals, the frequency of which is within the above limits. In this way, additional muscle potentials are filtered away, which would be comparable with heart action potentials, but mostly lie above or below pulse frequency. It must, of course, be considered as technically equivalent if the amplifier itself has filter characteristics in accordance with the present invention or if the frequency filter is provided in series with the amplifier, but before the same.

According to the present invention, a further improvement of the control apparatus is obtained if the action potentials sensed by the electrodes are amplified by the amplifier and immediately thereafter fed to the control input of the indicating device so that the signals delivered by the indicating device for indicating variations of pulse frequency are synchronous with the latter. In this way, not only abnormal pulse frequencies are reproduced, but at the same time it is also possible to survey heart activity and to recognize irregularities such as, for example, extrasystoles.

The control apparatus of the present invention therefore generally speaking is not only suitable for use by active individuals such as athletes, but also and especially for surveying heart and blood circulating patients who undergo physical therapy. The surveying may then be done by the patient himself, but the adjustment of the threshold value measuring element should, of course, be effected in accordance with instructions from the physician.

It has proven particularly advantageous, if, depending on the value of pulse frequency with reference to desired frequency, various acoustical or optical signals are yielded. It is then recommended to provide in zones wherein the frequencies are too high or too low, acoustic signals to assure reliable warning. In the normal frequency range, however, optical signals should be yielded to effect survey for pulse regularity also in this frequency range and to eliminate uncertainty as to the readiness of the surveying apparatus for operation.

It has also proven advantageous if the signals for too high and too low pulse frequencies respectively, have different characteristics to allow immediate conclusions as to the kind of difference of pulse frequencies. This can be realized in a simple manner by providing different numbers of acoustic signals per pulse beat for pulse frequencies which are too high or too low.

Advantageously, other characteristics of the signals, such as different sound frequencies of the acoustic signals, can be used. Considering individually varying action potentials it is of great advantage if input sensitivity of the amplifier is adjustable and therefore adaptable to personal needs.

As can be seen, the inventive features and technical progress of the object of the present invention result on one hand from new features and on the other hand from the combination and subcombination of all features used.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized at a basis for the designing of other structures for carrying out the several purposes of the invention. It is important, therefore, that the claims be regarded as including such equivalent constructions as do not depart from the spirit and scope of the invention.

Specific embodiments of the invention have been chosen for purposes of illustration and description, and are shown in the accompanying drawings, forming a part of the specification wherein:

FIG. 2 is a perspective view of the control apparatus;

FIGS. 5 and 6 illustrate other examples of the circuit of the control apparatus.

Figure 1:
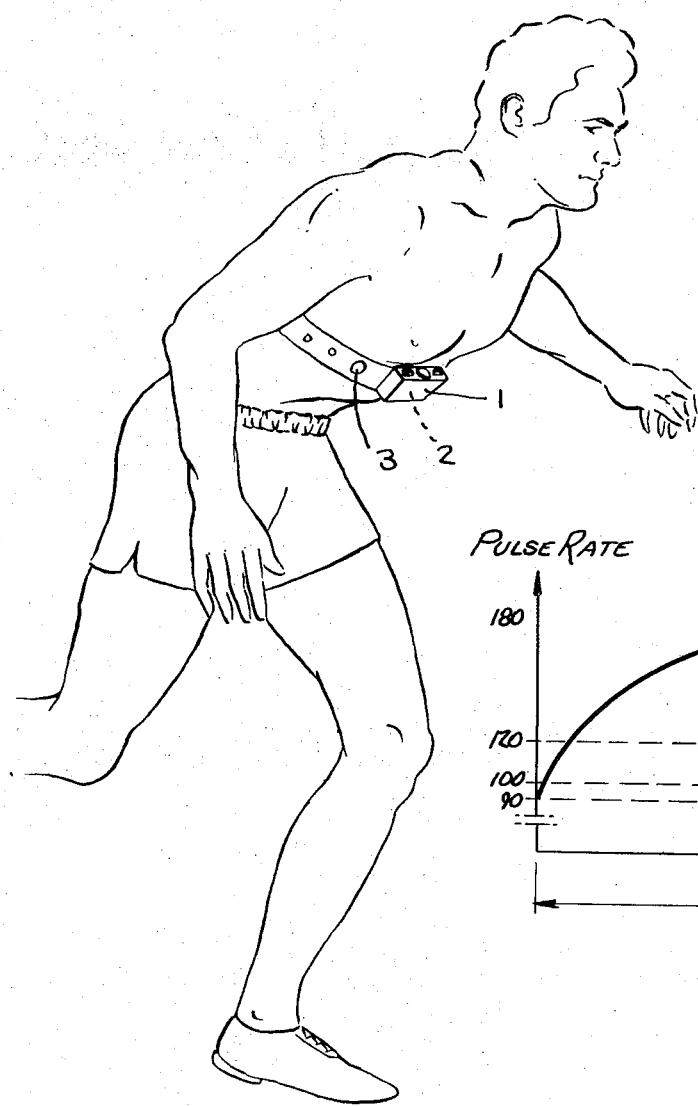
FIG. 1 shows an active person with a control apparatus for pulse surveying.

The person shown in FIG. 1 carries a control apparatus enclosed in a flat housing 1. In the housing 1 is placed apparatus 2 for surveying and evaluating the electrical voltages which are produced by the heart pulse and are sensed from the surface of the body by means of three electrodes 3. These voltages are a function of the individual's pulse. The electrical impulses produced by the voltage variations vary in the same rhythm as the pulses and are fed to the apparatus 2.

FIG. 2 shows a perspective view of the control apparatus. On the housing or enclosure 1, an elastic strip is fixed which serves to fix the enclosure on the body and to carrying the electrodes 3. The control apparatus contains a loudspeaker 5 which produces a buzzing signal if the surveyed upper limit is exceeded or if the surveyed pulse frequency passes below a lower limit selectable by means of a second knob 7.

Figure 3:
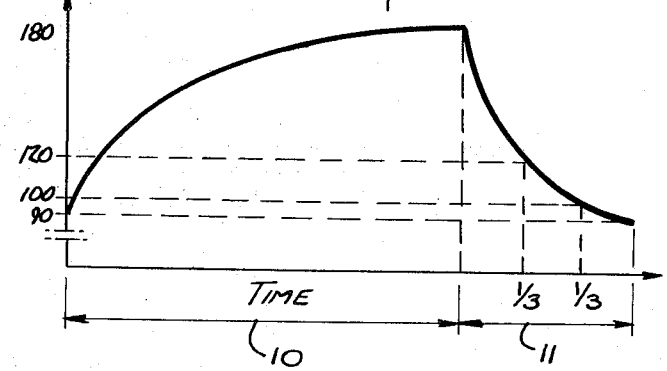
FIG. 3 is a graphic display of the pulse over time.

These two limits are hereafter described in more detail with reference to FIG. 3. This figure shows the pulse frequency over time. During training, it is absolutely necessary for the athlete to maintain personal fitness and never to exert himself to complete exhaustion. Furthermore, it is most important for the person to wait until the pulse rate has completely recovered before taking up training again. The time period 10 indicates the period in which the person is at work. Beginning with a normal value such as, e.g. 90 pulses per minute, the pulse frequency rises during training to an upper limit of e.g. 180 pulses per minute. Then a first threshold value measuring element responds and the loudspeaker yields an acoustic signal as a signal for the training person that the upper limit of the pulse rate has been reached. It will now be time for the person to pause, for the period 11. This recreation pause is only terminated if the pulse rate has again reached its original value. As soon as the pulse rate has reached its original value, a second threshold value measuring element responds to indicate the end of the recreation pause. Depending on the type of training, the recreation pauses may be adapted accordingly. For example, in so called interval permanent work, a recreation pause of only one-third of the complete recreation pause is necessary in order to obtain a large number of repetitions. In this type of training, the athlete sets the second threshold value measurer to e.g. 120 pulses per minute by means of the knob 7. In a fast running interval, the exertion of the person is higher, so that two-thirds of the complete recreation time are necessary to obtain a sufficient number of repetitions. For this purpose, the person for example, sets the knob 7 to 100 pulses per minute. In repetition running, a maximum exertion of the person is reached so that the whole recreation time must be used. In this case, the runner for example, sets the knob 7 to a normal value of e.g. 90 pulses per minute.

Figure 4:
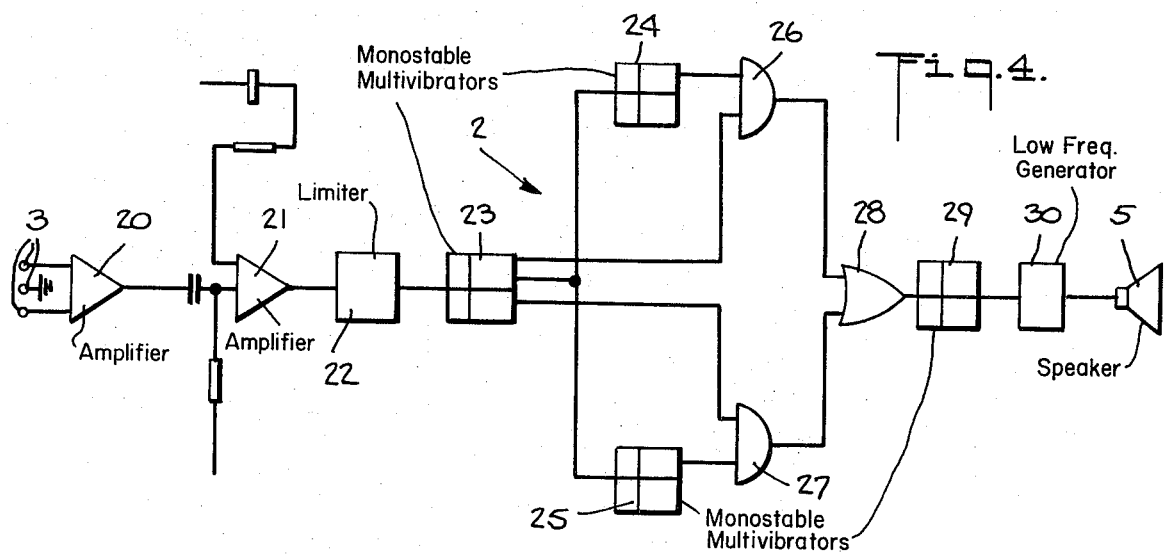
FIG. 4 is a circuit diagram of the apparatus for evaluating the measured pulse rate.

FIG. 4 shows the circuit for the apparatus 2. The voltage variations appearing at the electrodes according to the rhythm of the pulse are amplified by means of an amplifier 20 and fed to a second amplifier 21. The signals amplified by the second amplifier are fed to a monostable multivibrator 23 via a limiter 22. The multivibrator, according to the signals received, produces a sequence of impulses of constant amplitude and constant duration in the rhythm of the pulse.

These impulses are then fed to the monstable multivibrators 24, 25 and to the 'and' gates 26, 27 of a coincidence circuit. The outputs of the monostable multivibrators 24, 25 are connected with a second input of the 'and' gates 26, 27. The outputs of the 'and' gates 26, 27 are connected with an 'or' gate 28. A monostable multivibrator 29 is connected to the output of the 'or' gate 28 and the output of the vibrator 29 is connected with a low frequency generator 30, the output of which is connected to a loudspeaker 5.

The multivibrators 24, 25 acting as threshold value measurers serve to control the coincidence circuit 26, 27. The time which elapses until the two monostable multivibrators 24, 25 return to their stable condition can be individually regulated by means of the control knobs 6, 7 shown in FIG. 2. Thus, the return time of the monostable multivibrator 24 can be varied in a range of between 133 and 200 ms and the return time of the monostable multivibrator 25 in a range of between 300 and 466 ms. These times correspond to pulse rates of between 180 – 150 pulses per minute for multivibrator 24 and of between 120 and 90 pulses per minute for multivibrator 25.

When the apparatus is in the state of rest, no signal is present at the output of the limiter 22, the monostable multivibrator 23 is set. After 200 ms, the two monostable multivibrators 24, 25 are set. At the output of the multivibrator 23 connected with the first input of the 'and' gate 26, a binary '0' is present by which the 'and' gate 26 is closed. The 'and' gate 27 is closed because, to the second input of the 'and' gate 27, a binary '1' is fed by the output of the set multivibrator 25. The 'or' gate remains closed so that the low frequency generator 30 is not activated and the loudspeaker 5 does not yield any acoustic signal.

It is now assumed that the return time of the multivibrator 24 has been set to 175 ms and the return time of the multivibrator 25 to 400 ms which corresponds to 160 respectively 100 pulses per minute.

The number of pulses may now lie:
a. above the upper limit of 160 pulses per minute
b. below the lower limit of 100 pulses per minute; or
c. between these two threshold values.

In case (a), the next impulse appears at the output of the limiter 22 before the monostable multivibrator 24 has returned to its original state. This causes the two multivibrators 24, 25 to be reset. The 'and' gate 26 is opened because a coincidence has been registered. The 'or' gate 28 becomes conductive whereby the low frequency generator 30 is activated for approximately 70 ms via multivibrator 29 and the loudspeaker 5 yields an acoustic signal which shows that the upper limit has been exceeded.

In case (b), after resetting time of 175 ms has elapsed, the multivibrator 24 will return into its original state so that the 'and' gate is closed. After resetting time of 400 ms has elapsed, the 'and' gate 27 is opened because a coincidence has been registered there. A signal reaches the 'or' gate which sets the multivibrator 29 and thereby activates the low frequency generator 30 whereby the loudspeaker yields an acoustic signal which means that the recreation pause is terminated.

In case (c), after resetting time of 175 ms has elapsed, the multivibrator 24 returns to its original state so that the 'and' gate 26 is closed. If now the next impulse appears after resetting time of 175 ms, but before the resetting time of 400 ms of the multivibrator 25 has elapsed, the 'and' gate 27 remains closed and the 'or' gate is not opened. Therefore, the loudspeaker 5 remains silent. This indicates that the pulse rate is within the preselected limits.

According to FIG. 5, the control apparatus comprises an amplifier 31 which is fed with action potential by electrodes 31a. The amplifier 31 has an input sensitivity of 0.2 mV so that muscle potentials lower than this value are eliminated. A filter 32 is connected in series following the amplifier 31 and transmits the amplified signals to a second amplifier 33 within the range of 0.66 and 3.3 Hz which corresponds to the range of between 40 and 200 beats per minute.

Muscle potentials lying outside this frequency range are, however, filtered away. The amplifier 33 is provided with a sensitivity control device 34 for adapting sensitivity of the surveying apparatus to individual parameters.

The output of amplifier 33 is connected with a comparator 35 which receives signals from cycle timer 36, which signals correspond to the desired pulse frequency. The result of comparison is fed by the comparator 35 to a threshold value measuring element 37 which, upon exceeding of the desired value by actual pulse frequency, moves switch 38 from the shown position in which voltage is fed to lamp 39 over to the loudspeaker 40. The voltage supply for lamp 39 or loudspeaker 40, respectively, is effected by indicating device 41 which is controlled by the pulses delivered by amplifier 33 via comparator 35 so that lamp 39 or loudspeaker 40 yields signals in the rhythm of the pulse frequency. As can be seen, in the normal range, the pulse rate can be surveyed and at the same time the readiness of the apparatus for operation can be checked by observing lamp 39; whereas, if the desired value is exceeded, the loudspeaker 40 yields acoustic warning signals.

By using frequency filter 32 and by reducing the input sensitivity of amplifier 31, the sensing of muscle potentials and thereby the delivery of incorrect information to the surveying person is prevented in a most simple manner.

FIG. 6 shows another form of the control apparatus similar to FIG. 5 in which, however, the comparator 35 is fed by two cycle timers 36, 36a with different frequencies. The cycle timers which can be individually adjusted, permit the fixation of an upper and a lower limit value which include the normal frequency range. The release of signals depending on the various comparative values is effected by two threshold value measuring elements 37, 37a which control two switching devices 38, 38a. The switching devices themselves are fed by indicating device 41, so that depending on exceeding or undergoing of a threshold value, the threshold value measuring elements 37, 37a, actual information is given by lamp 39 or warning effected by loudspeaker 40. For the normal range, as in the example according to FIG. 5, indication by lamp 39 is provided whereas, upon exceeding of the maximum value, one two-tone signal per pulse beat is issued by loudspeaker 40. If the lower limit value fixed by threshold value measuring element 37 however, is undergone, loudspeaker 40 by corresponding control of switching device 38, yields a single tone per pulse beat so that the actual range of pulse frequency is immediately acoustically characterized.

From the foregoing description, it will be seen that the present control apparatus is of simple construction and can be produced economically so that the selling price is low. Furthermore, it presents the advantage of being small and of low weight so that the person is not hindered in activity. This control apparatus enables the athlete to adapt training to individual fitness without the help of supervisory personnel.

I believe that the construction and operation of my novel apparatus will now be understood, and that the several advantages thereof will be fully appreciated by those persons skilled in the art.

I claim:

1. Apparatus for surveying the physical efforts of a person, said apparatus comprising pulse sensing means, means for generating impulses in response to outputs from said pulse sensing means, first and second monostable multivibrators having means for separately adjusting their respective delay times for establishing high and low limit frequencies and being connected to be actuated by said impulses, first and second gate circuit means each having a first input connected to receive said impulses and each having a second input connected, respectively, to an output of said first and second monostable multivibrators, a signally means andd means connecting said signalling means for adjustment of same according to the outputs from either of said gate circuits, said monostable multivibrators including means for maintaining both said gate circuits closed for the duration between their respective delay times.

2. Apparatus according to claim 1, characterized in that amplifier means (20, 21, 31, 33) amplifies the output of said pulse sensing means and feeds the amplified signals to said means for generating impulses.

3. Apparatus according to claim 2, wherein the input sensitivity of said amplifier means is between 0.20 and 1 mV.

4. Apparatus according to claim 3, wherein said input sensitivity is 0.5 mV.

5. Apparatus according to claim 2, characterized in that a frequency filter (32) is connected in series with said amplifier means (31) and after the same, the band width of the frequency filter lying between 0.66 Hz and 3.3 Hz.

6. Apparatus according to claim 2, characterized by means for adjusting the input sensitivity of said amplifier means (30, 21, 31, 33).

7. Apparatus according to claim 1, characterized in that said signalling means includes display means convert said outputs from said gate circuits into acoustic warning signals.

8. Apparatus according to claim 7, characterized in that said signalling means includes display means produce different distinguishable signals according to the limit frequency exceeded.

9. Apparatus according to claim 8 characterized in that, said signalling means includes display means produce as respective distinguishing features of the signals, a different number of acoustic signals per pulse beat.

10. Apparatus according to claim 8, characterized in that, said signalling means includes display means produce as respective distinguishing features of the signals, frequency variations of the same.

11. Apparatus according to claim 8 characterized in that said signalling means includes display means produce optical signals in one frequency range and acoustical signals in another frequency range.

12. Apparatus according to claim 1, characterized in that said indicating means comprise means produce an acoustical signal.

13. Apparatus according to claim 1, characterized in that said indicating means comprise means produce an optical signal.

14. Apparatus according to claim 1 wherein said signalling means includes a low frequency generator and display means connected to said generator.

* * * * *

UNITED STATES PATENT OFFICE
CERTIFICATE OF CORRECTION

Patent No. 3,863,626          Dated  February 4, 1975

Inventor(s) ANTON HUBER

It is certified that error appears in the above-identified patent and that said Letters Patent are hereby corrected as shown below:

Column 3, line 8, change "at" to -- as --.

Column 6, line 48, change "andd" to -- and --.

Column 7, line  5, after "means" insert -- to --;
         line  9, after "means" insert -- to --;
         line 13, after "means" insert -- to --;
         line 17, after "means" insert -- to --.

Column 8, line  4, after "means" insert -- to --;
         line  8, after "means" insert -- to --;
         line 11, after "means" insert -- to --.

Signed and sealed this 8th day of April 1975.

(SEAL)
Attest:

RUTH C. MASON
Attesting Officer

C. MARSHALL DANN
Commissioner of Patents
and Trademarks